(12) United States Patent
Hannan et al.

(10) Patent No.: US 8,660,165 B2
(45) Date of Patent: Feb. 25, 2014

(54) SYSTEM AND METHOD FOR DETECTING SPREAD SPECTRUM SIGNALS IN A WIRELESS ENVIRONMENT

(75) Inventors: Ariful Hannan, Sterling, VA (US); John Carlson, Dulles, VA (US)

(73) Assignee: Andrew LLC, Hickory, NC (US)

(*) Notice: Subject to any disclaimer, the term of this patent is extended or adjusted under 35 U.S.C. 154(b) by 1161 days.

(21) Appl. No.: 12/482,746

(22) Filed: Jun. 11, 2009

(65) Prior Publication Data

US 2010/0316092 A1 Dec. 16, 2010

(51) Int. Cl.
*H04B 1/00* (2006.01)

(52) U.S. Cl.
USPC .................. 375/142; 375/140; 375/141

(58) Field of Classification Search
USPC ........................................... 375/142
See application file for complete search history.

(56) References Cited

U.S. PATENT DOCUMENTS

| | | |
|---|---|---|
| 5,222,104 A | 6/1993 | Medendorp |
| 5,862,460 A | 1/1999 | Rich |
| 6,055,431 A | 4/2000 | Dybdal |
| 6,088,384 A | 7/2000 | Hindman |
| 6,609,008 B1 | 8/2003 | Whang |
| 6,728,299 B2 | 4/2004 | Jung et al. |
| 6,741,638 B2 | 5/2004 | Ramberg et al. |
| 6,807,405 B1 | 10/2004 | Jagger et al. |
| 6,873,664 B1 | 3/2005 | Clark |
| 6,873,823 B2 | 3/2005 | Hasarchi |
| 6,889,033 B2 | 5/2005 | Bongfeldt |
| 7,013,160 B2 | 3/2006 | Tiedemann, Jr. et al. |
| 7,050,758 B2 | 5/2006 | Dalgleish |
| 7,058,400 B2 | 6/2006 | Brooks |
| 7,061,891 B1 | 6/2006 | Kilfoyle et al. |
| 7,061,967 B2 | 6/2006 | Schelm et al. |

(Continued)

FOREIGN PATENT DOCUMENTS

| | | |
|---|---|---|
| WO | WO9943100 | 8/1999 |
| WO | WO0036761 | 6/2000 |
| WO | WO0074290 | 7/2000 |
| WO | WO2007098313 | 8/2007 |

OTHER PUBLICATIONS

Six-page Invitation to Pay Additional Fees and, Where Applicable, Protest Fee, including Partial Search Report mailed Aug. 16, 2010 for PCT/US2010/028469.

(Continued)

*Primary Examiner* — Erin File
(74) *Attorney, Agent, or Firm* — Wood, Herron & Evans, LLP

(57) ABSTRACT

An apparatus for detecting a spread spectrum signal in a wireless signal environment includes at least one antenna for receiving spread spectrum signals, such as UMTS signals, from a signal source in the wireless signal environment. In one embodiment, a detection circuit is configured for correlating a code in signal received by the apparatus with a set of possible codes for spread spectrum signals in order to detect the existence of a spread spectrum signal. In another embodiment, a detection circuit is configured for obtaining at least one reference frame of data from a received signal. The detection circuit is further operable for correlating a segment of the reference frame with a repeated segment of at least one subsequent frame of data in order to detect the existence of a spread spectrum signal. A repeater might incorporate such an apparatus wherein the variable gain of the repeater is adjusted based upon the correlation and the detection of a spread spectrum signal.

20 Claims, 5 Drawing Sheets

(56) References Cited

U.S. PATENT DOCUMENTS

| | | |
|---|---|---|
| 7,096,035 B2 | 8/2006 | Gouessant |
| 7,171,252 B1 | 1/2007 | Scarantino et al. |
| 7,206,336 B1 | 4/2007 | Rog |
| 7,233,771 B2 | 6/2007 | Proctor, Jr. |
| 7,266,103 B2 | 9/2007 | Anderson et al. |
| 7,333,563 B2 | 2/2008 | Chan et al. |
| 7,336,597 B2 | 2/2008 | Maltsev et al. |
| 7,366,142 B2 | 4/2008 | Ngai et al. |
| 7,522,556 B2 | 4/2009 | Hanna et al. |
| 7,936,711 B2 | 5/2011 | Kilfoyle et al. |
| 7,979,022 B2 * | 7/2011 | Cho et al. .................... 455/11.1 |
| 2002/0028655 A1 | 3/2002 | Rosener |
| 2003/0046891 A1 | 3/2003 | Colada et al. |
| 2003/0123401 A1 | 7/2003 | Dean |
| 2004/0131027 A1 | 7/2004 | Lokio |
| 2004/0156097 A1 | 8/2004 | Roper |
| 2005/0118949 A1 | 6/2005 | Allen |
| 2005/0176368 A1 | 8/2005 | Young |
| 2005/0272367 A1 | 12/2005 | Rodgers |
| 2006/0068828 A1 | 3/2006 | Eckl |
| 2006/0203757 A1 | 9/2006 | Young |
| 2007/0014337 A1 * | 1/2007 | Kim et al. .................... 375/151 |
| 2007/0188235 A1 | 8/2007 | Dean |
| 2007/0202826 A1 | 8/2007 | Dean |
| 2008/0062906 A1 | 3/2008 | Baker |
| 2008/0240024 A1 | 10/2008 | Rao |
| 2010/0208775 A1 | 8/2010 | Weill |
| 2010/0284445 A1 * | 11/2010 | Barriac et al. ................ 375/211 |
| 2012/0170620 A1 * | 7/2012 | Ranson et al. ................ 375/214 |

OTHER PUBLICATIONS

Sixteen-page International Search Report and Written Opinion mailed Mar. 16, 2011 for PCT/US2010/028469.

* cited by examiner

| PREAMBLE SIGNATURE | VALUE OF n | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| $P_0(n)$ | 1 | 1 | 1 | 1 | 1 | 1 | 1 | 1 | 1 | 1 | 1 | 1 | 1 | 1 | 1 | 1 |
| $P_1(n)$ | 1 | -1 | 1 | -1 | 1 | -1 | 1 | -1 | 1 | -1 | 1 | -1 | 1 | -1 | 1 | -1 |
| $P_2(n)$ | 1 | 1 | -1 | -1 | 1 | 1 | -1 | -1 | 1 | 1 | -1 | -1 | 1 | 1 | -1 | -1 |
| $P_3(n)$ | 1 | -1 | -1 | 1 | 1 | -1 | -1 | 1 | 1 | -1 | -1 | 1 | 1 | -1 | -1 | 1 |
| $P_4(n)$ | 1 | 1 | 1 | 1 | -1 | -1 | -1 | -1 | 1 | 1 | 1 | 1 | -1 | -1 | -1 | -1 |
| $P_5(n)$ | 1 | -1 | 1 | -1 | -1 | 1 | -1 | 1 | 1 | -1 | 1 | -1 | -1 | 1 | -1 | 1 |
| $P_6(n)$ | 1 | 1 | -1 | -1 | -1 | -1 | 1 | 1 | 1 | 1 | -1 | -1 | -1 | -1 | 1 | 1 |
| $P_7(n)$ | 1 | -1 | -1 | 1 | -1 | 1 | 1 | -1 | 1 | -1 | -1 | 1 | -1 | 1 | 1 | -1 |
| $P_8(n)$ | 1 | 1 | 1 | 1 | 1 | 1 | 1 | 1 | -1 | -1 | -1 | -1 | -1 | -1 | -1 | -1 |
| $P_9(n)$ | 1 | -1 | 1 | -1 | 1 | -1 | 1 | -1 | -1 | 1 | -1 | 1 | -1 | 1 | -1 | 1 |
| $P_{10}(n)$ | 1 | 1 | -1 | -1 | 1 | 1 | -1 | -1 | -1 | -1 | 1 | 1 | -1 | -1 | 1 | 1 |
| $P_{11}(n)$ | 1 | -1 | -1 | 1 | 1 | -1 | -1 | 1 | -1 | 1 | 1 | -1 | -1 | 1 | 1 | -1 |
| $P_{12}(n)$ | 1 | 1 | 1 | 1 | -1 | -1 | -1 | -1 | -1 | -1 | -1 | -1 | 1 | 1 | 1 | 1 |
| $P_{13}(n)$ | 1 | -1 | 1 | -1 | -1 | 1 | -1 | 1 | -1 | 1 | -1 | 1 | 1 | -1 | 1 | -1 |
| $P_{14}(n)$ | 1 | 1 | 1 | 1 | -1 | -1 | -1 | -1 | 1 | 1 | 1 | 1 | 1 | 1 | -1 | -1 |
| $P_{15}n)$ | 1 | -1 | -1 | 1 | -1 | 1 | 1 | -1 | -1 | 1 | 1 | -1 | 1 | -1 | -1 | 1 |

FIG. 8

SYSTEM AND METHOD FOR DETECTING SPREAD SPECTRUM SIGNALS IN A WIRELESS ENVIRONMENT

FIELD OF THE INVENTION

The present invention is directed generally to detecting the existence of signals in a wireless communication environment, and more particularly to an apparatus and method for detecting a spread spectrum signal, such as a UMTS signal, and for controlling a device or system based on such signal detection.

BACKGROUND OF THE INVENTION

The detection of spread spectrum signals and signal traffic may be useful for a variety of different purposes. For example, the operation of certain wireless systems may be adjusted depending on whether they are handling signal traffic or not. However, there is an inherently difficult problem in determining the existence of spread spectrum signals for the purpose of making decisions about the operational parameters of a wireless system. In spread spectrum technology, the signals are subject to spreading codes, which are often called "Pseudo Noise" (PN) codes. Because of the noise-like structure of the signals, they are difficult to detect when the spreading codes are not known. Generally, in certain applications, the system will not have knowledge of the codes of the spread spectrum signals that it processes. As such, it becomes difficult to detect the signals or to adjust the operational parameters based on such signal detection.

One particular wireless system that might benefit from such signal detection is a system using one or more repeaters. In existing wireless technologies, signal repeating devices, or "repeaters" are used to extend the coverage of an overall wireless or cellular system. For example, often such wireless or cellular systems include a plurality of base stations or base transceiver stations (BTS) that communicate with each other. The BTS operate in an overlapping fashion to provide a defined signal coverage area for user equipment (UE), such as a cell phone or other wireless device. In such coverage areas, there are often smaller, more remote areas that have very low signal reception, such as areas within buildings or areas that are otherwise obstructed. Rather than implementing another costly and large base station to provide coverage to such low signal areas, signal repeating devices or repeaters are utilized.

A repeater operates with one or more adjacent BTS or other signal sources and increases usable signal coverage to the low signal areas. A repeater has a donor antenna that is in communication with the one or more BTS. The repeater receives downlink signals from the BTS or other signal source, processes and amplifies those signals, and then transmits or repeats the received signals through a coverage antenna into the remote area that otherwise has low signal reception or low signal power. An uplink signal from another signal source, such as a cellular phone or other UE, is similarly repeated in the uplink direction.

For example, referring to FIG. 1, a portion of a wireless communication system 10 might include a base station or BTS 12 or other signal source that communicates with a repeater 14 having a donor antenna 16, a coverage antenna 18, and processing electronics 20 that are configured to process and amplify the repeated signal. Accordingly, downlink wireless signals 22 from the BTS 12 are received by the donor antenna 16 of the repeater. The downlink signals are then amplified and transmitted through the coverage antenna 18 as repeated downlink signals 22a. The repeated downlink signals 22a are transmitted into the remote area and are received by the UE that may include one or more wireless communication devices, such as cell phones 24, as shown in FIG. 1. Similarly, in an uplink direction, as indicated by reference numerals 26 and 26a, the UE devices 24 or other signal sources communicate signals 26a back to the coverage antenna 18, and the signals 26a are then transmitted as repeated uplink signals 26 back to the BTS 12. As would be readily understood by a person of ordinary skill in the art, such repeater devices 14 can take many different forms.

One particular performance characteristic of a repeater is the operational gain of the repeater, or the amount of amplification that the repeater applies to the repeated signal. In many applications of a repeater within a wireless system, it is desirable to vary the gain of the repeater based upon signal traffic and signal transmission parameters. For example, in a spread spectrum system, such as a CDMA system that utilizes spread spectrum signal traffic, it may be desirable to decrease the gain of the repeater based upon the absence of any spread spectrum signal traffic through the repeater. Otherwise, a repeater that continuously operates at a high gain will increase the interference level within the wireless coverage area.

As noted, spread spectrum signals appear generally noise-like in structure and are thus susceptible to the overall noise figure within the wireless system. Therefore, the overall network capacity within a spread spectrum communication network is a function of the interference or noise level within that wireless network. As such, it is desirable to automatically adjust the gain, and specifically decrease the gain when there is no signal traffic through the repeater. Conversely, when spread spectrum signal traffic is present, it would be desirable to increase the repeater gain for better signal to noise performance.

There is an inherently difficult problem in automatically controlling the gain of a repeater within a spread spectrum system based upon the existence or absence of spread spectrum signal traffic due to the noise-like structure of the signals. A repeater will not have knowledge of the codes of the spread spectrum signals that it repeats. As such, it becomes difficult to automatically adjust the gain of a repeater based upon such signal detection.

Accordingly, there exists a need in the art to detect spread spectrum signals provide gain control within a repeater, and particularly to provide gain control for a repeater in a network utilizing spread spectrum signals.

SUMMARY OF THE INVENTION

An apparatus for detecting a spread spectrum signal in a wireless signal environment includes at least one antenna for receiving spread spectrum signals, such as UMTS signals, from a signal source in a wireless signal environment. A detection circuit is configured to detect the existence of a spread spectrum signal in the received signals. In one embodiment, the detection circuit correlates a code in the spread spectrum signal received by the apparatus with a set of possible codes for spread spectrum signals. In another embodiment, the detection circuit is configured for obtaining at least one reference frame of data from a received UMTS signal. The detection circuit then correlates a segment of the reference frame with a repeated segment of at least one subsequent frame of data in order to detect the existence of a spread spectrum signal. The apparatus might be incorporated for control of another device in the wireless environment, such as a repeater device, for example. A repeater might incorporate such an apparatus wherein the variable gain of the repeater is adjusted based upon the correlation and the detection of a spread spectrum signal.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

FIG. 8 is a table of preamble signatures for use in an embodiment of the invention.

DETAILED DESCRIPTION OF THE INVENTION

The present invention is directed to a system and method for automatic gain control of a repeater utilizing detection of a spread spectrum signal to trigger and manage the gain control. An embodiment of the invention provides detection of a CDMA spread spectrum signal in the Universal Mobile Telecommunications System (UMTS) format, and particularly utilizes UMTS uplink detection and exploits the periodicity and prior knowledge of the UMTS uplink signal characteristics. The present invention, in one specific embodiment, processes UMTS signal characteristics when a connection is about to be established (idle mode) between the BTS and the UE. In another embodiment, UMTS signal characteristics are processed when a connection already exists between the UE and the BTS (connected mode).

Figure 2:
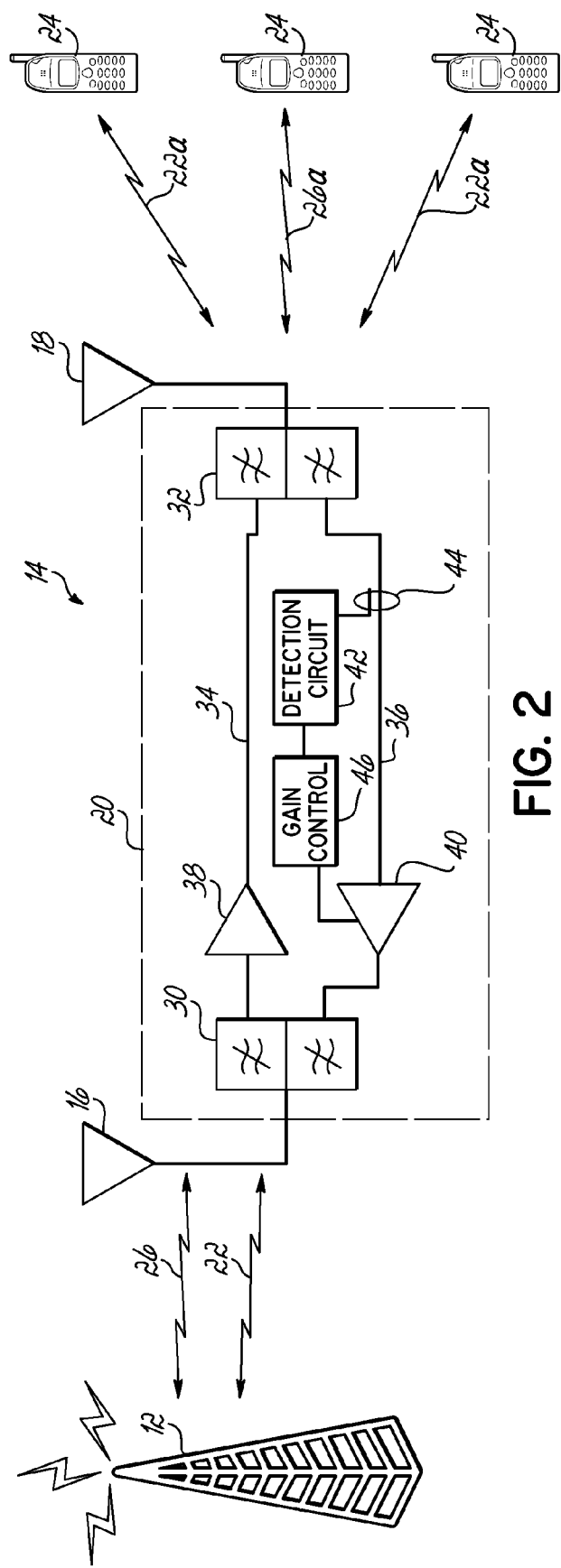
FIG. 2 is another schematic diagram of a repeater utilized within a wireless system for incorporating an embodiment of the present invention.

FIG. 2 is a schematic diagram of an embodiment of the invention illustrating a repeater 14 within a wireless system. Processing electronics 20 are positioned between a donor antenna 16 and a coverage antenna 18. FIG. 2 schematically illustrates some of the various components of the process electronics 20 for describing embodiments of the invention. However, a person of ordinary skill in the art will understand that the process electronics 20 within a repeater would generally include various other components (not shown). As such, FIG. 2 is not meant to be limiting or complete with respect to the invention.

Figure 1:
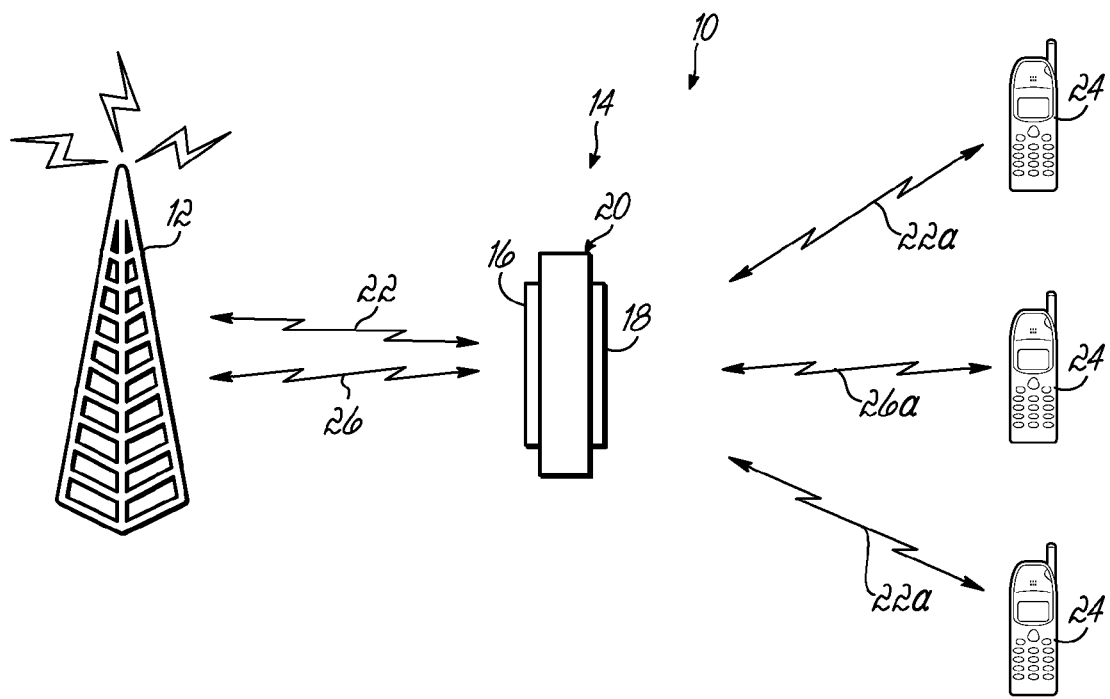
FIG. 1 is a schematic diagram of a repeater utilized within a wireless system for incorporating an embodiment of the present invention.

Referring to FIG. 2, antennas 16 and 18 feed into respective duplexers 30, 32 to provide frequency isolation between a downlink path 34 and an uplink path 36. In both the downlink and uplink paths 34, 36, the signals are amplified by one or more amplifiers or amplifier components/circuits illustrated schematically as components 38 and 40 in FIG. 2. Repeater 14 repeats signals between multiple signal sources, such as base station 12 and user equipment (UE) 24. Like reference numerals are utilized in FIG. 2 for those components also shown in FIG. 1.

Repeater 14, and particularly the process electronics 20 of the repeater, includes a detection circuit 42 that couples off a portion of the uplink signal 36 at a suitable coupling point 44 using an appropriate coupler. The detection circuit 42 is configured for isolating and reviewing the uplink signal, and correlating a portion of that signal with subsequent portions of the signal to detect the existence of a spread spectrum signal within the uplink traffic 36. A gain control circuit 46 is operably coupled to the uplink amplifier 40 for varying the gain of the amplifier, and thus, varying the gain of the repeater 14 based upon the correlation process and the detection of a spread spectrum signal, as provided by the detection circuit 42. The detection circuit 42 and gain control circuit 46 may be implemented in various different ways, such as utilizing a processor and suitable frequency up-conversion and down-conversion circuitry for processing the uplink signals 36 to implement suitable correlation techniques as discussed herein.

Figure 2A:
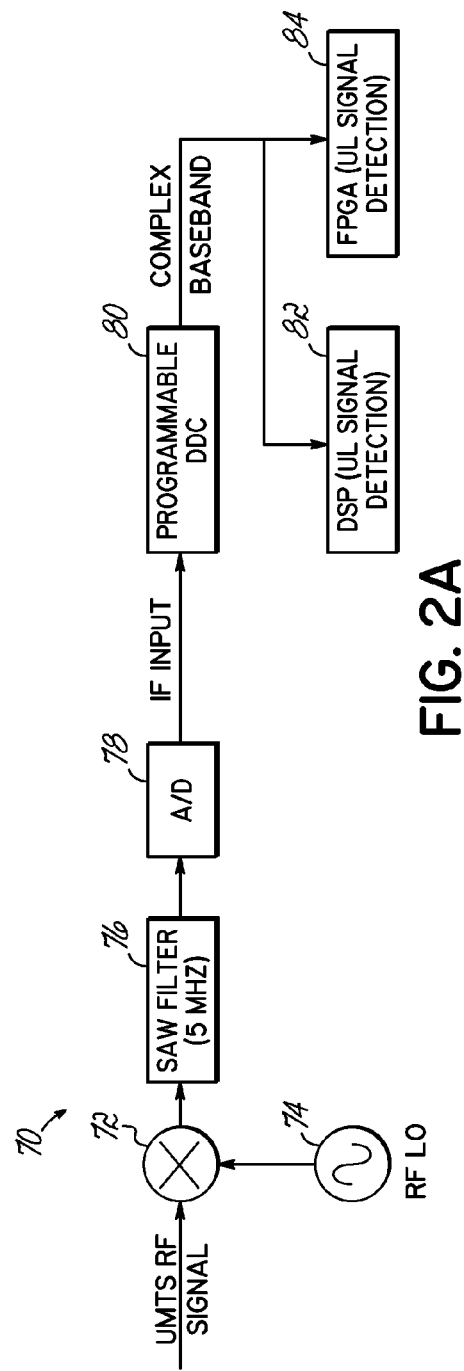
FIG. 2A is a block diagram for an exemplary receiver as used in the present invention.

The uplink signal that is transmitted from the mobile UE is received at the repeater or other detection terminal, and can be downconverted from an RF signal to a complex baseband signal using a heterodyne, super heterodyne, or direct conversion receiver. The block diagram as illustrated in FIG. 2A shows an example of a receiver for use in uplink detection in accordance with an aspect of the invention. The receiver 70 might be incorporated into the detection circuit 42. For example, the receiver 70 might be a heterodyne receiver that receives the RF signal, such as a UMTS signal, as an input and then downconverts the signal to a complex baseband signal. The detected signal is downconverted to IF with a mixer 72 and appropriate LO signal 74, as is conventional. The IF signal is then filtered with filter 76, such as a 5 MHz SAW filter. An A/D converter 78 converts the IF signal to a digital IF signal which is then further downconverted to a complex baseband signal with a programmable digital downconverter (DDC) circuit 80. Other forms of receiver might also be used in alternative embodiments, such as single stage or direct downconversion receivers can be used as would be understood by a person of ordinary skill in the art. The processing for the detection of UL signal traffic might be handled in the digital complex baseband domain by a digital signal processor (DSP) 82 or programmable array (FPGA) 84 or both, as shown in 2A.

In the UMTS spread spectrum signal format, there are two basic operational modes for the UE. They are Idle mode and Connected mode. When the UE, such as a mobile phone, is in Idle mode, it is basically camping on a BTS 12 or on a cell, and there is essentially no transmission in the system from that particular UE. The UE stays in Idle mode until it is ready to transmit data such as for a phone call. At that time, the UE transmits to request a Radio Resource Control (RRC) connection. Once the RRC is established, and the UE is in Connected mode, there are different states which define the actual physical UMTS channel the UE is using.

Figure 3:
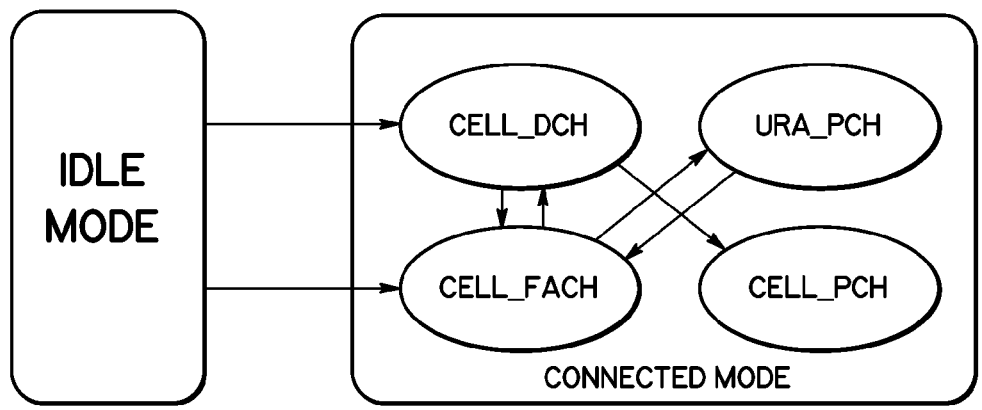
FIG. 3 is a state diagram of a UMTS system utilized for the present invention.

As illustrated in FIG. 3, once the RRC is established, the UE can be in one of several RRC states in Connected mode depending upon the user activity. These states are: URA_PCH, CELL_PCH, CELL_FACH, and CELL_DCH. In CELL_PCH and URA_PCH, no data communication is possible and minimum radio and battery resources are consumed. As noted, when a UE wants to establish an RRC connection, it sends an RRC connection setup request from the UE. This is accomplished using a Random Access Channel (RACH), which is an uplink transport channel. The RACH is also used to send small packets of data during cell updates/reselection procedures, or when the UE is on the CELL_FACH and URA_PCH connected states. Once the RRC is established, the UE will communicate in either the CELL_DCH state or CELL-_FACH state.

In the CELL_FACH state, data communication is possible, but with a very low data rate and a high round-trip time due to the properties of the shared channel that is used in this state. However, in the CELL_DCH state, the UE is assigned a dedicated physical channel so that communication with a high data rate and a low round-trip time is possible. During this time, the UE uses a Dedicated Physical Data Channel (DPDCH) for data transmission and the Dedicated Physical Control Channel (DPCCH) for control information.

In accordance with various embodiments of the invention, the Random Access Chanel (RACH) and its characteristics and/or the Dedicated Physical Control Channel (DPCCH) and its characteristics are utilized and monitored for uplink activity detection. Specifically, a repeater is configured to monitor those two specific uplink channels in various different ways to determine whether spread spectrum signal traffic is being transmitted through the repeater 14. Upon detecting the uplink activity and the presence of the spread spectrum signal, the repeater automatically increases its gain so that it functions efficiently to provide the desired gain and the desired signal/noise (S/N) characteristics for the repeated signal. Conversely, when no uplink signal activity is detected and no spread spectrum is present, the repeater decreases the gain to improve network capacity by reducing interference within the system that is based on the high repeater gain.

As discussed further hereinbelow, in one embodiment the invention exploits an underlying periodicity in the DPCCH channel frame structure for the purposes of detecting uplink activity and spread spectrum signal traffic in the repeater. In another embodiment, the statistical prior knowledge of the Physical Random Access Channel (PRACH) onto which the RACH is mapped is utilized to detect spread spectrum signal traffic. The present invention thus, utilizes certain features of the DPCCH and/or PRACH channels to detect the presence of a spread spectrum signal that is buried in noise and interference from other logical channels sharing the same physical RF channel. In one embodiment, for the purpose of detecting the Uplink signal from different mobile UE's 24 in a particular area, both the PRACH and DPCCH channels should be processed and monitored simultaneously.

PRACH Channel Detection

The PRACH channel in a UMTS signal uses predefined preambles or preamble codes for signaling purposes in signaling the BTS. In accordance with one aspect of the invention, the preamble, or preamble code, is detected at the repeater by correlating the preamble code in an uplink signal with known preamble code reference wave forms for the cell or BTS associated with the repeater. The PRACH channel is based on a slotted ALOHA scheme. There are fifteen access slots per each of two frames. The frames are 10 ms each. The PRACH channel has 4,096 chips of a preamble code, which are repeated on access slots to gain access until an Acquisition Indicator Channel (AICH) is received. The PRACH preamble code consists of 256 repetitions of a signature having a length of 16 chips. The scrambling codes used in the PRACH/preamble by a mobile UE within a cell area are based on a mapping from the downlink scrambling codes for the PRACH signal. It is on that basis that one embodiment of the invention detects spread spectrum signal traffic.

The scrambling code for the PRACH preamble is constructed from the long scrambling sequences as discussed below. There are 8192 PRACH preamble scrambling codes in total for use in the channel. The 8192 PRACH preamble scrambling codes are divided into 512 groups with 16 codes in each group. There is a one-to-one correspondence between the group of PRACH preamble scrambling codes used in a cell and the primary scrambling code used in the downlink of the cell. Thus, there is the same one-to-one correspondence between the preamble scrambling codes and the downlink in the repeaters operating in the cell. As known to a person of ordinary skill in the art, the PRACH the preamble code $C_{pre,n}$, is a complex valued sequence. The preamble code is constructed from a preamble scrambling code $S_{r-pre,n}$ and a preamble signature $C_{sig,s}$ as follows:

$$C_{pre,n,s}(k) = S_{r-pre,n}(k) \times C_{sig,s}(k) \times e^{j(\frac{\pi}{4}+\frac{\pi}{2}k)}, k = 0, 1, 2, 3, \ldots 4095$$

where k=0 corresponds to the chip transmitted first in time. $S_{r-pre,n}$ and $C_{sig,s}$ are defined below.

The preamble scrambling code $S_{r-pre,n}$ for forming the PRACH preamble code is constructed from the long scrambling sequences as understood in the context of the UMTS signal format. There are 8192 PRACH preamble scrambling codes in total. The n:th preamble scrambling code, n=0, 1 . . . , 8191, is defined as:

$$S_{r-pre,n}(i)=C_{long,1,n}(i), i=0, 1, \ldots, 4095$$

The long scrambling sequences $C_{long,1,n}$ are constructed from the position-wise modulo 2 sum of 38400 chip segments of two binary m-sequences generated by means of two generator polynomials of degree 25, as known in the UMTS format and published specifications. With x and y being the two m-sequences respectively, the x sequence is constructed using the primitive (over GF(2)) polynomial $x^{25}+x^3+1$. The y sequence is constructed using the polynomial $x^{25}+x^3+x^2+x+1$. The resulting sequences thus constitute segments of a set of Gold sequences.

The 8192 PRACH preamble scrambling codes are divided into 512 groups with 16 codes in each group as noted above. There is a one-to-one correspondence between the group of PRACH preamble scrambling codes used in a particular cell or at a particular BTS, and the primary scrambling code that is used in the downlink traffic of the cell/BTS. The k:th PRACH preamble scrambling code within the cell with downlink primary scrambling code of m (k=0, 1, 2 . . . 15 and m=0, 1, 2, . . . 511), is $S_{r-pre,n}(i)$ as defined above, with n=16×m+k, according to the UMTS standard.

The preamble signature that is also used to create the preamble code $C_{pre,n}$, consists of 256 repetitions of a length 16 signature $P_s$ (n), n=0 . . . 15.
This is defined as follows:

$$C_{sig,s}(i)=p_s(i \text{ MODULO } 16), i=0, 1, \ldots, 4095$$

The signature $P_s$ (n) is from the set of 16 Hadamard codes of length 16 that are shown in FIG. 8.

For a downlink primary scrambling code, there can be 16 possible scrambling codes used for the uplink PRACH channel. Each scrambling code could then use any of the 16 possible preamble signature codes or signatures. So, there could be 256 patterns (i.e., combinations of preamble scrambling code (16) and preamble signature code (16)) that could be used by a mobile in a cell area for the PRACH channel. In one embodiment, the PRACH is detected by correlating an uplink signal pattern with all the possible patterns in a cell.

Referring to FIG. 2, repeater 14 is located within a cell associated with BTS 12. The detection circuit 42 monitors the uplink signal 36. Specifically, the detection circuit or detector 42 continuously monitors for uplink activity on the PRACH channel in the uplink path 36. The RF signal is converted to a complex baseband signal and processed in real time. As illustrated in FIGS. 2 and 2A, the RF uplink signal 36 is coupled off at an appropriate coupling point 44 for the purposes of down-conversion to a baseband signal. As further illustrated in FIG. 2A, the detection circuit 42 might include appropriate downconverter circuitry for converting the uplink signal into a baseband form that may be more properly processed for detection in accordance with the invention. The detection circuit 42 is configured for obtaining the preamble code from the complex baseband uplink signal in the repeater. The detection circuit is operable for correlating the obtained uplink signal code with a set of all possible codes or code patterns for the spread spectrum signals that are handled by the repeater within the cell in order to detect the existence of a spread spectrum signal.

In one embodiment of the invention, wherein the repeater handles UMTS signals, the 256 possible preamble patterns for the PRACH channel may be stored or might be generated. For example, the patterns may be generated based on the 16 possible scrambling codes for the cell or BTS, along with the 16 possible preamble signatures. Alternatively, the 256 possible preamble patterns could be pre-computed and stored in memory for access during correlation.

Figure 7:
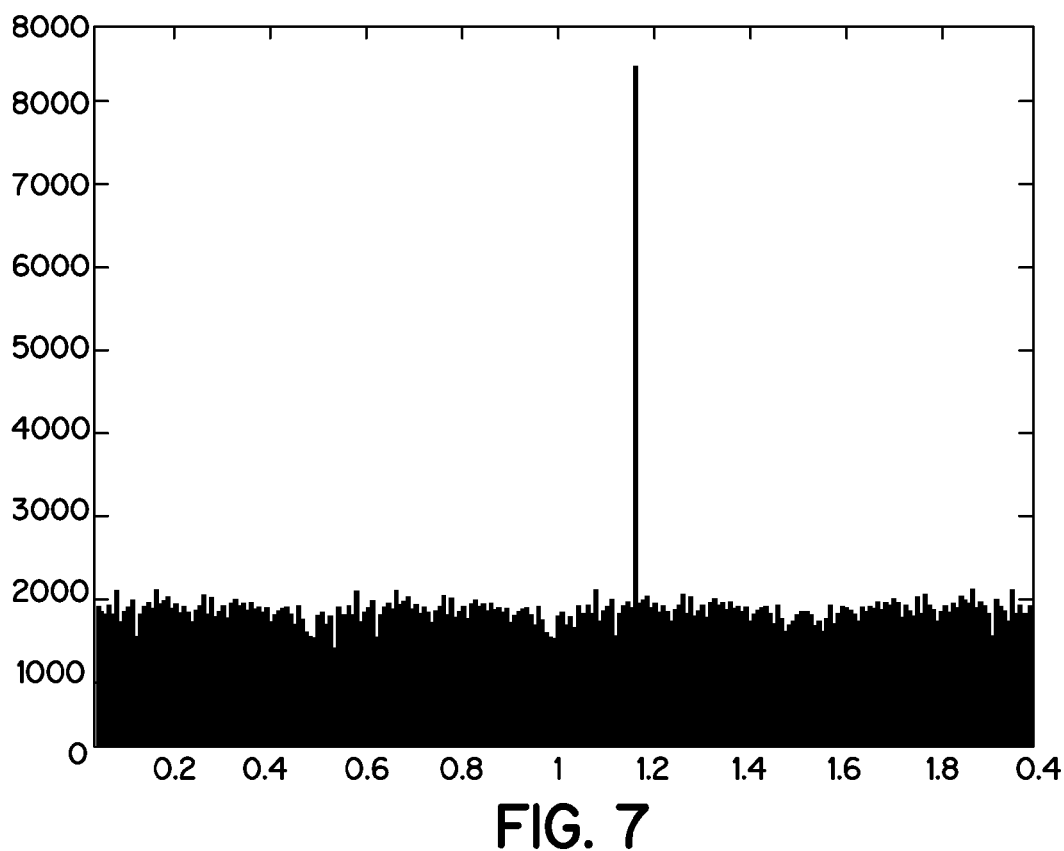
FIG. 7 is a schematic illustration of the results of detection of a spread spectrum signal in accordance with an embodiment of the present invention.

Simulation in an additive white Gaussian noise (AWGN) channel established that correlating with the preamble pattern in accordance with one aspect of the invention can be reliably detected at levels down to a −25 dB SINR level. FIG. 7 illustrates PRACH preamble detection, as performed by the present invention at a 25 dB SINR. The peak illustrates the existence of spread spectrum signal traffic for the purpose of gain control.

Accordingly, in the embodiment of the present invention utilizing the PRACH channel, the detection circuit is configured for correlating a code from the uplink signal with a set of possible codes or code patterns that exist within the spread spectrum signal handled by the repeater for a particular cell, or within an area defined by a particular BTS. The possible preamble patterns represent prior knowledge regarding the spread spectrum signals that are handled by the repeater in order to detect the existence of a spread spectrum signal. In a UTMS embodiment of the invention, the preamble patterns take into account the preamble scrambling codes as well as the possible preamble signatures for the purposes of the correlation. Based upon the correlation and the detection of the spread spectrum signal, the gain of the amplifier or other amplification circuit within the repeater is varied. For example, when a spread spectrum signal is detected based upon the correlation, the gain is increased. Conversely, when a spread spectrum signal is not detected based on the correlation, the gain is decreased so as to lower the overall noise factor in the network, and thus, improve network capacity.

DPCCH Channel Detection

In accordance with another embodiment of the present invention, the periodicity of characteristics of the data control channel DPCCH is utilized for detecting the presence of a spread spectrum signal. Specifically, the detection circuit is configured for obtaining at least one reference frame of data and, preferably multiple frames, from an uplink signal of the repeater. The detection circuit is operable for correlating a segment of the one or more reference frames from the DPCCH channel, with a repeated segment of one or more subsequent frames of data in the DPCCH channel in order to detect the existence of a spread spectrum signal. The gain of the amplifier is then varied based upon the correlation and the detection of the spread spectrum signal.

In an embodiment of the invention utilizing UMTS signals, the reference frames, and specifically pilot bits of the reference frames, are correlated with pilot bits of additional subsequent frames of data in order to detect the existence of a spread spectrum signal. When the boundaries of the reference frames and subsequent frames are aligned, the alignment of the periodic pilot bits provides correlation peaks in the detection.

Figure 5:
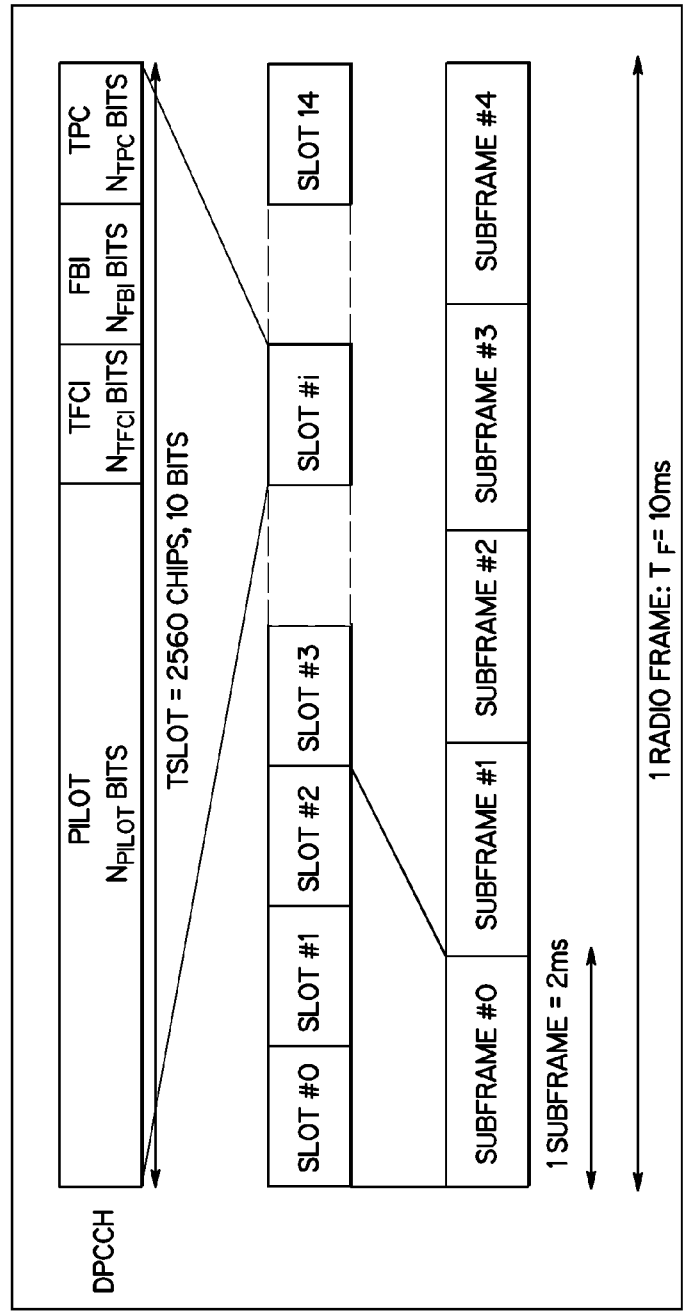
FIG. 5 is another signal block diagram illustrating an uplink signal portion for implementing an embodiment of the present invention.

More specifically, the uplink DPCCH channel carries control information. The control information includes data frames, as illustrated in FIG. 5 that include sub frames and slots. Each slot in the frames includes known Pilot bits that support channel estimation at baseband. The Pilot bits for each slot in a UMTS signal have a known pattern. The pattern is repeated for each frame. This repetitive nature of the Pilot bits over all frames is exploited to detect spread spectrum signal activity in the uplink.

Referring to FIG. 2, the detection method utilizes a correlation of part of the received uplink signal 36, such as a segment of one or more data frames (reference frames), with other time segments of the received uplink signal, such as a segment of one or more subsequent frames of data. Detection 42 provides the necessary processing and correlation. The periodicity that exists due to the DPCCH pilot bits is used in the correlation, which exhibits detection peaks when the DPCCH bits of two or more correlated segments align. The peaks in the correlation indicate the existence of an uplink UMTS signal. In the absence of the noted data frame segments, there will be no alignment and no detection peaks because of the fact that the interference or noise does not exhibit high correlation between two time-dispersed segments.

Figure 4:
FIG. 4 is a signal block diagram illustrating an uplink signal portion for implementing an embodiment of the present invention.

FIG. 4 illustrates the received downlink signals in path 36 that are processed in the invention. X is the reference signal or segment of a data frame or data frames that is captured from one portion of the received uplink signal. Y is the remaining portion, which is correlated with the reference portion X. FIG. 5 illustrates a data frame and segments (slots, sub-frames) of the data frame that may be used in the present invention. FIG. 5 specifically shows a DPCCH frame for a UMTS signal for one embodiment of the invention.

As an example, the pilot bits on slot #0 of the frame shown in FIG. 5 for a UMTS DPCCH channel will have the same pilot bits as slot #0 of all subsequent or succeeding and preceding frames as well. The complex scrambling codes applied on the data are unique to a specific user and UE, but are repeated for every frame.

In one embodiment of the invention, the detection circuit 42 and subsequent algorithm that it executes correlates subsequent frames of the received complex uplink signal with frames of the uplink reference signal to detect the presence of the UMTS signal. Several uplink frames of the complex baseband UMTS signal are stored and utilized as reference frames. The reference frames are then correlated continually against all subsequent received frames. The reference signal is formed by taking at least one frame and preferably the first few frames of the received signal. The length of the reference signal depends upon the allowable coherent integration window of the time domain correlation. Coherent integration requires that the reference signal X and the signal to be correlated Y in FIG. 5 do not have frequency jitter or timing jitter present. If the received signal has time jitters and frequency jitter present, then the reference signal should be short ensuring that the sum of the products in correlation aligns properly. For example, a 5 frame-long reference signal could be formed for coherent integration in a typical case where timing and frequency jitters are negligible. The actual size of the reference signal may vary and might be chosen from lab and field tests, along with the required performance criteria. In one embodiment, the length of the reference signal may be varied for different environments and also may be programmable.

Figure 6:
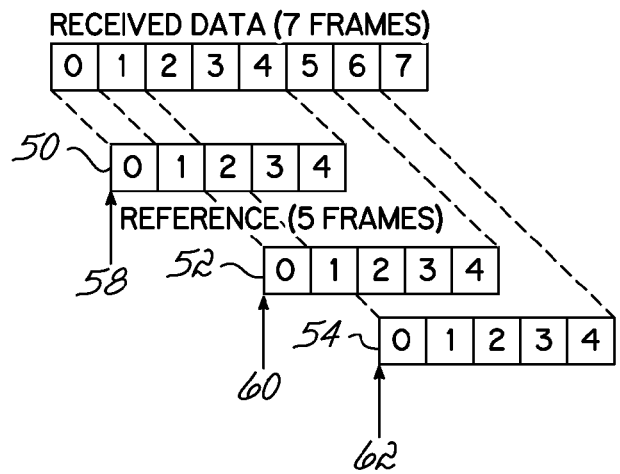
FIG. 6 is a schematic illustration of frame correlation in accordance with an embodiment of the invention.

Referring to FIG. 6, the reference uplink signal 50 is correlated with subsequent uplink signals represented by frames 52, 54 offset from the start of the received reference signal 50. When the frame boundaries 58 of the reference signal 50 align with the received signals 52, 54 and their respective frame boundaries 60, 62, as shown in FIG. 6, the correlation exhibits a peak. To detect signals at a very low Signal-to-Noise-Ratio (SINR), non-coherent addition can be performed on the coherent integration results in several coherent groups. When a correlation is done, the sum of the product of the complex signal should peak above the noise level. However, for a severely low SNR, it might be required to add groups of such correlation in a way to add non-coherently. That is, their magnitudes only are added. Since their product of complex signal phases may not align from group to group, only their magnitudes are added.

The selection of the required coherent and non-coherent integration time is a function of the needed processing gain in order to achieve reliable detection. It has been determined that to achieve good performance of detection at −18 dB SINR, a coherent correlation over five frames and non-coherently adding over two such groups gives a desired level of confidence on the existence of any spread spectrum signal at that level. The non-coherent and coherent integration length may vary and might be determined by field test and lab tests.

Analysis may be done to quantitatively determine the probability of detection and false alarms as a function of the processing gain. Such analysis is a well-known exercise for those skilled in the art and lies outside the scope of this disclosure.

Correlation Peak Detection

The correlation is performed as noted for the various different embodiments of the present invention. The detection circuit 42 evaluates detected peaks to determine the presence or absence of a spread spectrum signal like a UMTS signal. The peak is detected by the following metric:

$$\text{DETECTION METRIC} = 10 \times \text{LOG}_{10} \left\{ \frac{\text{PEAK OF CORRELATION} - \text{MEAN OF CORRELATION}}{\text{STANDARD DURATION OF CORRELATION}} \right\} dB$$

This detection metric, a de-meaned peak to standard deviation ratio, does not require a noise power measurement. It is also independent of the number of non-coherent additions and is robust in the presence of Automatic Gain Control (AGC) fluctuations. Also the non-coherent additions of the magnitude (or magnitude squared) of correlation results elevates the noise level in the summed correlation result. Experimentation with data has established that the metric, (peak-mean)/standard deviation, indicates the distinctness of the peak regardless of how much the mean is elevated. When measuring de-meaned peak to standard deviation ratio, a few samples around the peak are excluded for mean and standard deviation calculation. Such correlation techniques in the field of detection and estimation would be understood by a person of skill in the art.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept

What is claimed is:

1. A repeater for repeating signals between multiple sources, the repeater comprising:
    a donor antenna and a coverage antenna for transceiving signals that are repeated between the multiple sources;
    an amplification circuit positioned between donor and coverage antennas for amplifying the repeated signals, the amplification circuit having a variable gain;
    a set of possible codes for the repeater, the set representing the codes that would exist within spread spectrum signals that are handled by the repeater;
    a detection circuit operable to correlate a code obtained from an uplink signal to the repeater with the set of possible codes for spread spectrum signals that are handled by the repeater and operable for using the correlation in order to detect the existence of a spread spectrum uplink signal;
    the amplification circuit operably coupled with the detection circuit and operating to vary the gain of the amplification circuit based upon the correlation and the detection of a spread spectrum uplink signal.

2. The repeater of claim 1 wherein the spread spectrum signal is a UMTS signal.

3. The repeater of claim 2 wherein the code that is correlated is a preamble code for the UMTS signal.

4. The repeater of claim 3 wherein the preamble code is a preamble code for PRACH channel of the UMTS signal, and the detection circuit correlates the PRACH preamble code with a set of possible PRACH preamble codes for UMTS signals handled by the repeater.

5. A method for repeating signals between multiple sources, the method comprising:
    transceiving signals repeated between the multiple sources with a donor antenna and a coverage antenna;
    amplifying the repeated signals between the antennas with an amplification circuit having a variable gain;
    providing a set of possible codes, the set representing the codes that would exist within spread spectrum signals that are to be repeated between the multiple sources;
    correlating a code that is obtained from an uplink signal from at least one source with the set of possible codes for spread spectrum signals that are to be repeated and using the correlation in order to detect the existence of a spread spectrum uplink signal;
    varying the gain of the amplification circuit based upon the correlation and the detection of a spread spectrum uplink signal.

6. The method of claim 5 further comprising increasing the gain when a spread spectrum uplink signal is detected based on the correlation.

7. The method of claim 5 further comprising decreasing the gain when a spread spectrum uplink signal is not detected based on the correlation.

8. The method of claim 5 wherein the spread spectrum signal is a UMTS signal.

9. The method of claim 8 further comprising correlating a preamble code with a set of possible preamble codes for spread spectrum signals that are handled by the repeater.

10. The method of claim 9 wherein the preamble code is a preamble code for PRACH channel of the UMTS signal, and further comprising correlating the PRACH preamble code with a set of possible PRACH preamble codes for UMTS signals handled by the repeater.

11. An apparatus for detecting a spread spectrum signal in a wireless signal environment, the apparatus comprising:
   at least one antenna for receiving uplink UMTS signals from a signal source in the wireless signal environment;
   a set of possible codes for the apparatus, the set representing the codes that would exist within UMTS signals that are handled by the apparatus in the wireless signal environment;
   a detection circuit operable to correlate a code obtained from an uplink UMTS signal received by the apparatus with the set of possible codes for spread spectrum UMTS signals that are handled by the apparatus and operable for using the correlation in order to detect the existence of a spread spectrum uplink signal.

12. The apparatus of claim 11 wherein the code is a preamble code for the UMTS signal.

13. The apparatus of claim 12 wherein the preamble code is a preamble code for a PRACH channel of the UMTS signal, and the detection circuit is configured for correlating the PRACH preamble code with a set of possible PRACH preamble codes for UMTS signals handled by the repeater.

14. The apparatus of claim 11 further comprising an amplification circuit for amplifying the received UMTS signal, the apparatus configured for increasing the gain of the amplification circuit when a spread spectrum signal is detected based on the correlation.

15. A method for detecting a spread spectrum signal in a wireless signal environment, the method comprising:
   receiving uplink UMTS signals from a signal source in the wireless signal environment;
   providing a set of possible codes, the set representing the codes that would exist within UMTS signals that are handled in the wireless signal environment;
   correlating a code obtained from an uplink UMTS signal from a signal source with the set of possible codes for spread spectrum UMTS signals and using the correlation in order to detect the existence of a spread spectrum uplink signal.

16. The method of claim 15 further comprising varying the gain of an amplification circuit that amplifies the received UMTS signal based upon the correlation and the detection of a spread spectrum signal.

17. The method of claim 16 further comprising increasing the gain when a spread spectrum signal is detected based on the correlation.

18. The method of claim 16 further comprising decreasing the gain when a spread spectrum signal is not detected based on the correlation.

19. The method of claim 15 further comprising correlating a preamble code with a set of possible preamble codes for spread spectrum signals.

20. The method of claim 15 wherein the preamble code is a preamble code for PRACH channel of the UMTS signal, and further comprising correlating the PRACH preamble code with a set of possible PRACH preamble codes for UMTS.

* * * * *